United States Patent
Bucci et al.

(10) Patent No.: US 9,830,130 B2
(45) Date of Patent: Nov. 28, 2017

(54) RANDOM NUMBER GENERATOR

(71) Applicant: Infineon Technologies AG, Neubiberg (DE)

(72) Inventors: Marco Bucci, Graz (AT); Raimondo Luzzi, Graz (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 52 days.

(21) Appl. No.: 15/045,272

(22) Filed: Feb. 17, 2016

(65) Prior Publication Data
US 2016/0253153 A1    Sep. 1, 2016

(30) Foreign Application Priority Data
Feb. 24, 2015 (DE) .................. 10 2015 102 602

(51) Int. Cl.
*G06F 7/58* (2006.01)
*G06F 21/60* (2013.01)

(52) U.S. Cl.
CPC ............ *G06F 7/588* (2013.01); *G06F 21/602* (2013.01)

(58) Field of Classification Search
CPC ............................... G06F 7/588; G06F 21/602
USPC .................................................. 708/250–256
See application file for complete search history.

(56) References Cited

U.S. PATENT DOCUMENTS

| | | |
|---|---|---|
| 8,624,634 B1 | 1/2014 | Luzzi et al. |
| 2003/0037079 A1* | 2/2003 | Wilber ............... G06F 7/588 |
| | | 708/250 |
| 2007/0282934 A1* | 12/2007 | Luzzi ................. G06F 7/58 |
| | | 708/250 |
| 2009/0222502 A1 | 9/2009 | Ikegami et al. |
| 2009/0248771 A1 | 10/2009 | Vergnes et al. |

OTHER PUBLICATIONS

Killmann et al., "A proposal for: Functionality classes for random number generators", version 2.0, Sep. 2011, 133 pages.
"Lyapunov exponent", http://en.wikipedia.org/wiki/Lyapunov_exponent, obtained on Feb. 18, 2015, 6 pages.

* cited by examiner

*Primary Examiner* — Tan V. Mai
(74) *Attorney, Agent, or Firm* — Viering, Jentschura & Partner mbB (57) ABSTRACT

According to one embodiment, a random number generator is provided including an oscillator arrangement including a first oscillator and a second oscillator. The oscillator arrangement is configured such that a predetermined output state of the second oscillator triggers a transition of the first oscillator from a first oscillation speed to a second oscillation speed and a predetermined output state of the first oscillator triggers a transition of the first oscillator from the second oscillation speed to the first oscillation speed. The random number generator may further include a counter circuit configured to count the number of clock cycles of at least one of the first oscillator or the second oscillator between two transitions of the first oscillator from the first oscillation speed to the second oscillation speed and an output circuit configured to output a random number based on the counted number of clock cycles.

20 Claims, 12 Drawing Sheets

RANDOM NUMBER GENERATOR

CROSS-REFERENCE TO RELATED APPLICATION

This application claims priority to German Patent Application Serial No. 10 2015 102 602.3, which was filed Feb. 24, 2015, and is incorporated herein by reference in its entirety.

TECHNICAL FIELD

The present disclosure relates to random number generators.

BACKGROUND

Random numbers are often needed in electronic devices, such as chip cards, for example for cryptographic applications. When a sequence of random numbers is generated, an important quality parameter of the sequence is its entropy since only high entropy ensures high security, e.g. ensures that an attacker cannot guess random numbers of the sequence. Accordingly, approaches to generate random number sequences with almost maximal entropy are desirable.

SUMMARY

According to one embodiment, a random number generator is provided including an oscillator arrangement including a first oscillator and a second oscillator. The oscillator arrangement is configured such that a predetermined output state of the second oscillator triggers a transition of the first oscillator from a first oscillation speed to a second oscillation speed and a predetermined output state of the first oscillator triggers a transition of the first oscillator from the second oscillation speed to the first oscillation speed. The random number generator may further include a counter circuit configured to count the number of clock cycles of at least one of the first oscillator or the second oscillator between two transitions of the first oscillator from the first oscillation speed to the second oscillation speed and an output circuit configured to output a random number based on the counted number of clock cycles.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
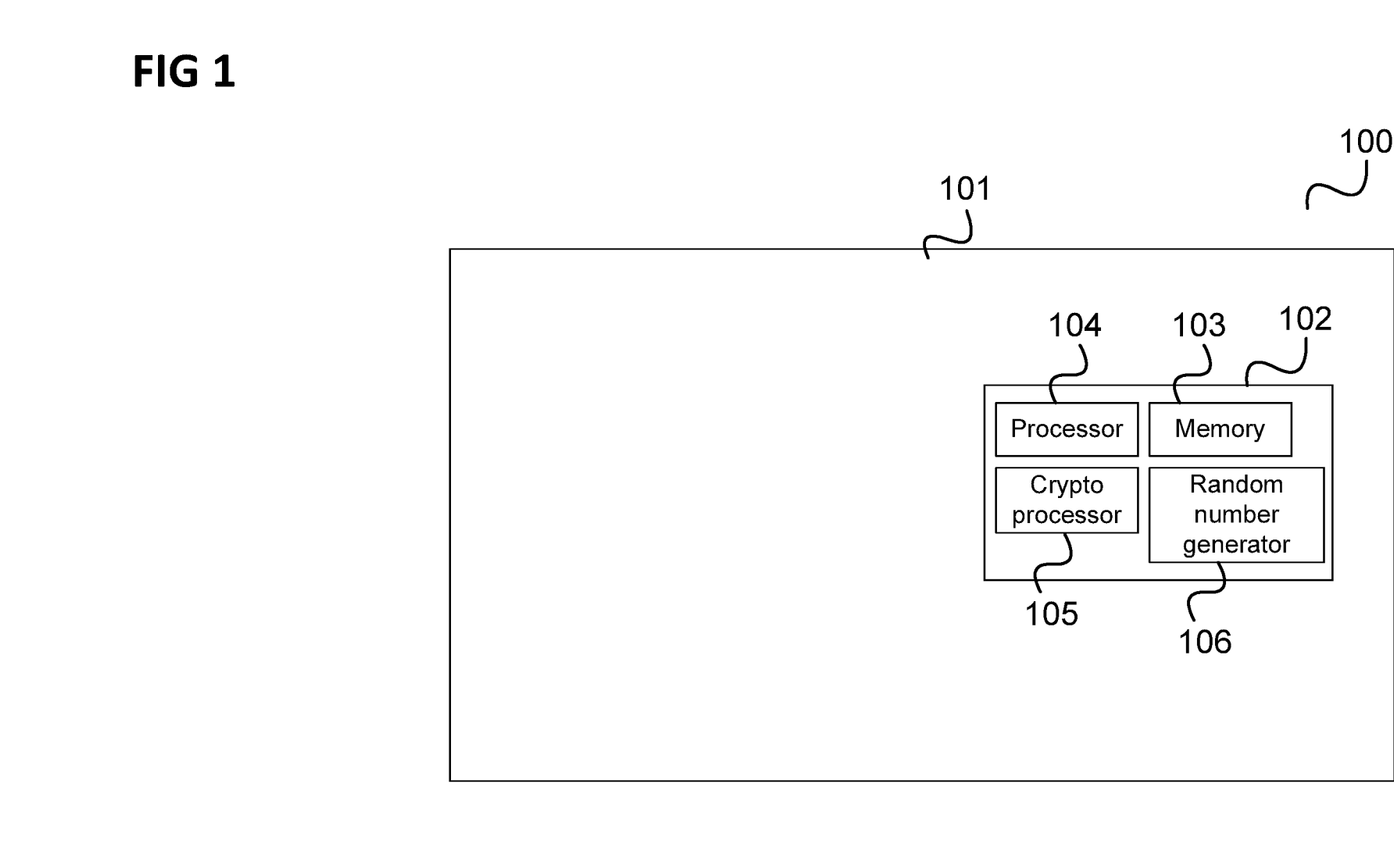
FIG. 1 shows a chip card.

FIG. 1 shows a chip card 100.

The chip card 100 includes a carrier 101 on which a chip card module 102 is arranged. The chip card module 102 includes various data processing components like for example a memory 103, a processor 104 and for example a dedicated crypto processor 105.

The chip card module 103 includes a random number generator 106. The random number generator 106 may for example supply a random number sequence to the processor 104 or the crypto processor 105 which may for example perform a cryptographic operation based on the random number sequence.

Figure 2:
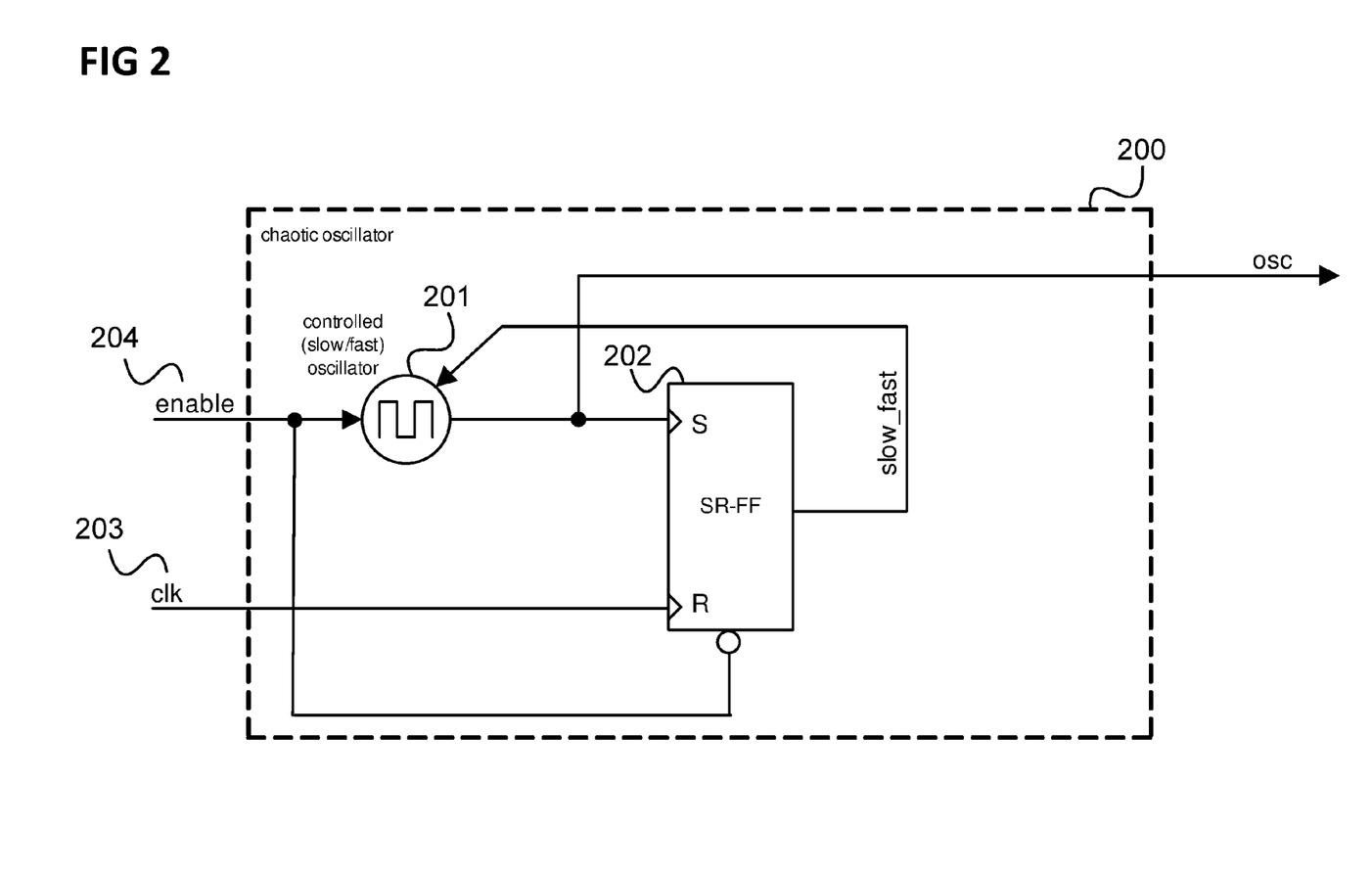
FIG. 2 shows a chaotic oscillator.

The random number generator 106 may for example include a chaotic oscillator as shown in FIG. 2 as noise source.

FIG. 2 shows a chaotic oscillator 200.

The chaotic oscillator 200 includes a controlled oscillator 201 whose speed can be switched between two different frequencies (referred to as slow and fast, e.g. in the range of multiples of 1 MHz, e.g. fast frequency is 2 Mhz and slow frequency is 1 MHz) and an edge-triggered set-reset flip-flop (SR-FF) 202 which is set by the active edge of the controlled oscillator 201 and reset by the active edge of a reference oscillator, i.e. by a clock signal 203 (external clock, clk). Accordingly, the controlled oscillator 201 is connected to the S input of the flip-flop 202 and the clock signal 203 is fed to the R input of the flip-flop 202.

The output of the flip-flop 202 controls the frequency of the controlled oscillator 201: When it is set, it sets the controlled oscillator 201 to fast and when it is reset, it sets the controls the controlled oscillator to slow. The output of the controlled oscillator 201 is the output of the chaotic oscillator 200. The flip-flop 202 and the controlled oscillator 201 are activated by an enable signal 204.

Figure 3:
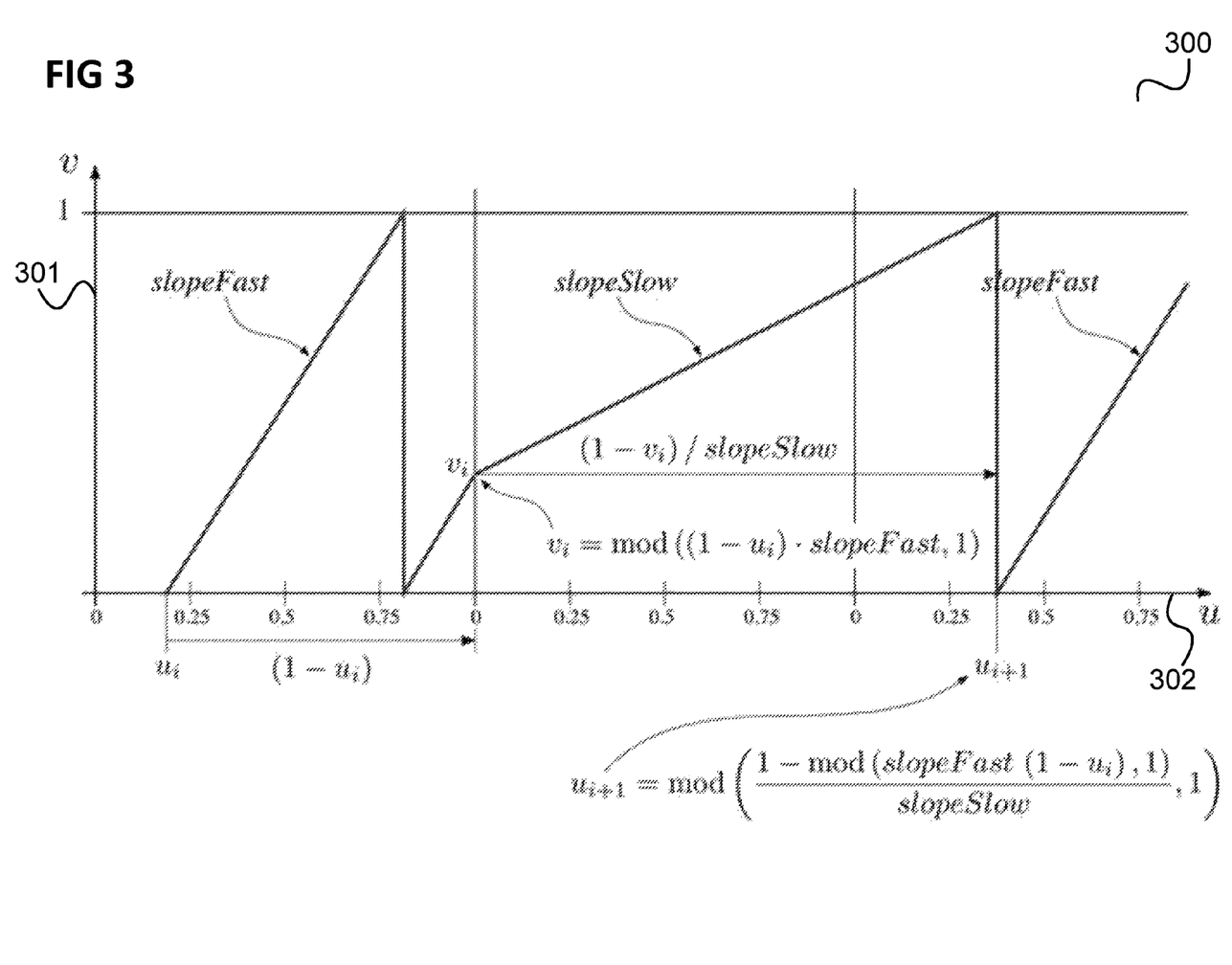
FIG. 3 shows a phase diagram for the controlled oscillator of FIG. 2.

The phase evolution of the controlled oscillator 201 is illustrated in FIG. 3.

FIG. 3 shows a phase diagram 300 for the controlled oscillator 201.

The phase v of the controlled oscillator 201 varies between 0 and 1 along a phase axis 301. It is shown with respect to time which is given in terms of the phase u (between 0 and 1) of the reference clock signal 203 along a time axis 302.

As can be seen, assuming the controlled oscillator 201 is in the fast configuration, on the rising edge of the reference oscillator, i.e. at phase u=0 of the clock signal 203, the speed of the controlled oscillator is switched immediately to slow and the rest of the period is performed at slow speed. On its own rising edge (i.e. at phase v=1), the controlled oscillator 201 switches back to the fast configuration. slopeFast is the phase variation in fast configuration and slopeSlow is the phase variation in slow configuration.

Defining the state variable of the corresponding discrete-time chaotic system as the phase of the reference oscillator (i.e. the clock signal 203) when the controlled oscillator 201 switches back to the fast configuration, the chaotic map of the state variable can be derived geometrically from FIG. 3 and it results in:

$$u_{i+2} = mod\left(\frac{1 - mod(slopeFast(1 - u_i), 1)}{slopeSlow}, 1\right) \quad (1)$$

where $u_{i+1}$ is the value of the state variable at the (i+1)-th iteration given the state variable at the i-th iteration $u_i$. It can be shown that the chaotic map is a piecewise linear function with constant derivative k=slopeFast/slopeSlow. The constant ln |k| represents what is known in the chaos theory as Lyapunov exponent of the chaotic system and the entropy rate of the system (i.e. the entropy generated at each iteration) is equal to $\log_2(k)$.

Figure 4:
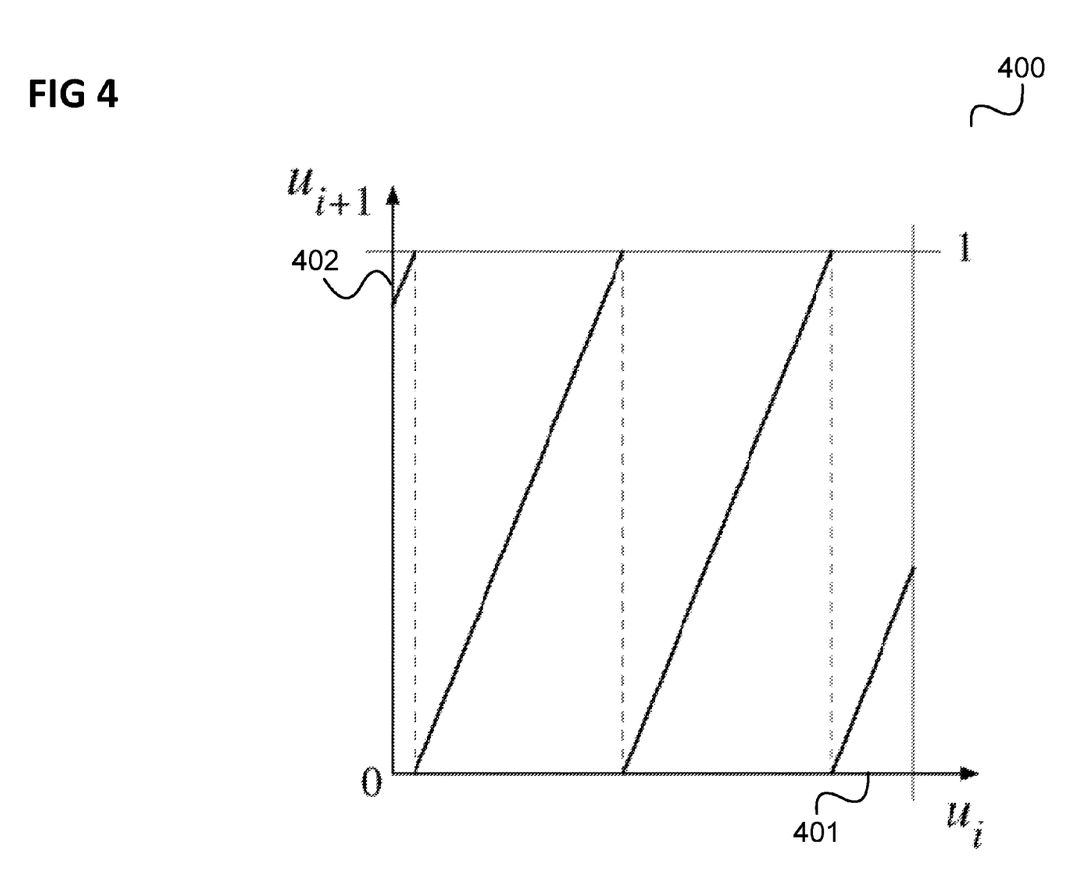
FIGS. 4, 5 and 6 show chaotic maps for three cases of the chaotic system of FIG. 2.
Figure 5:
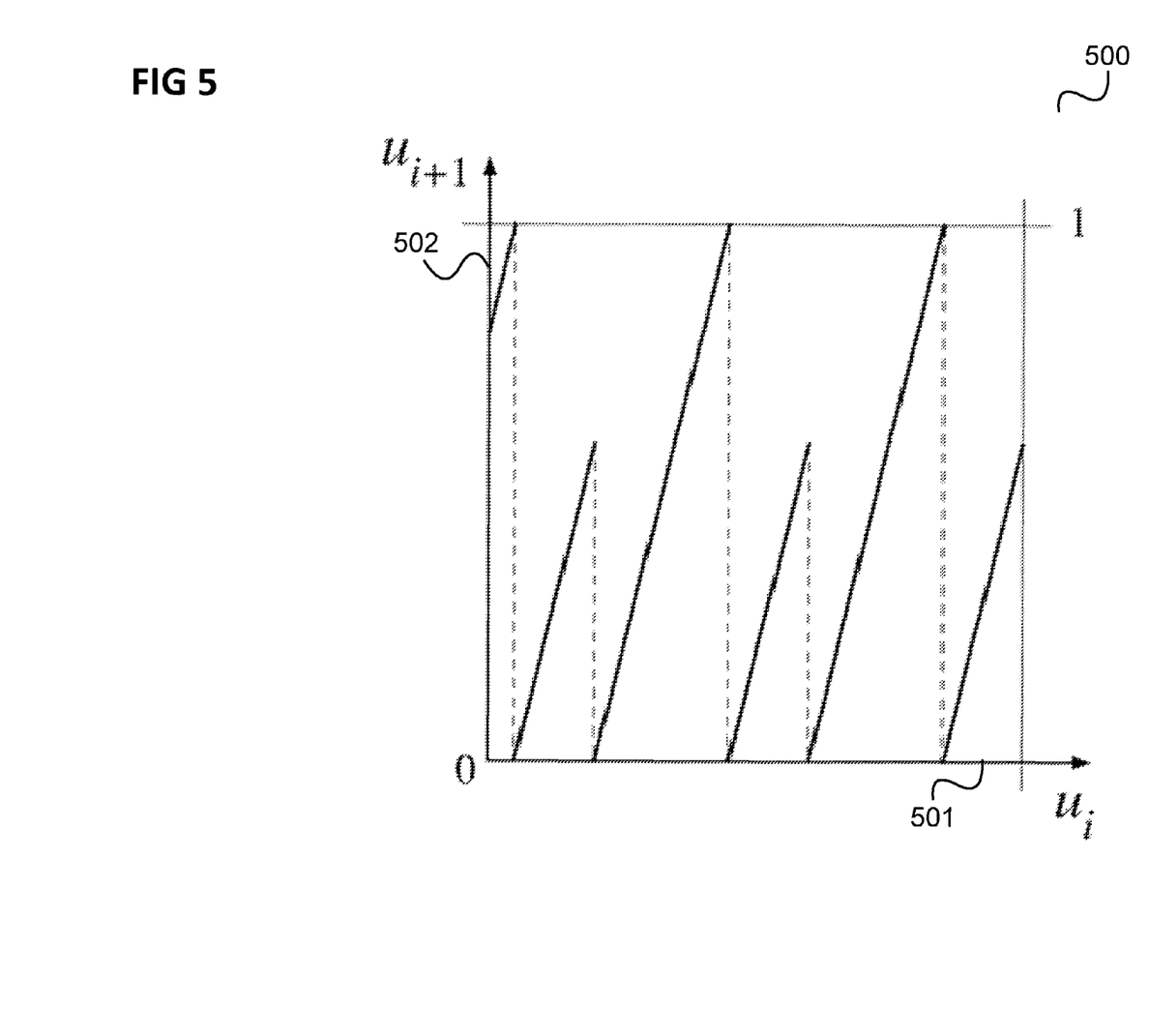
Figure 6:
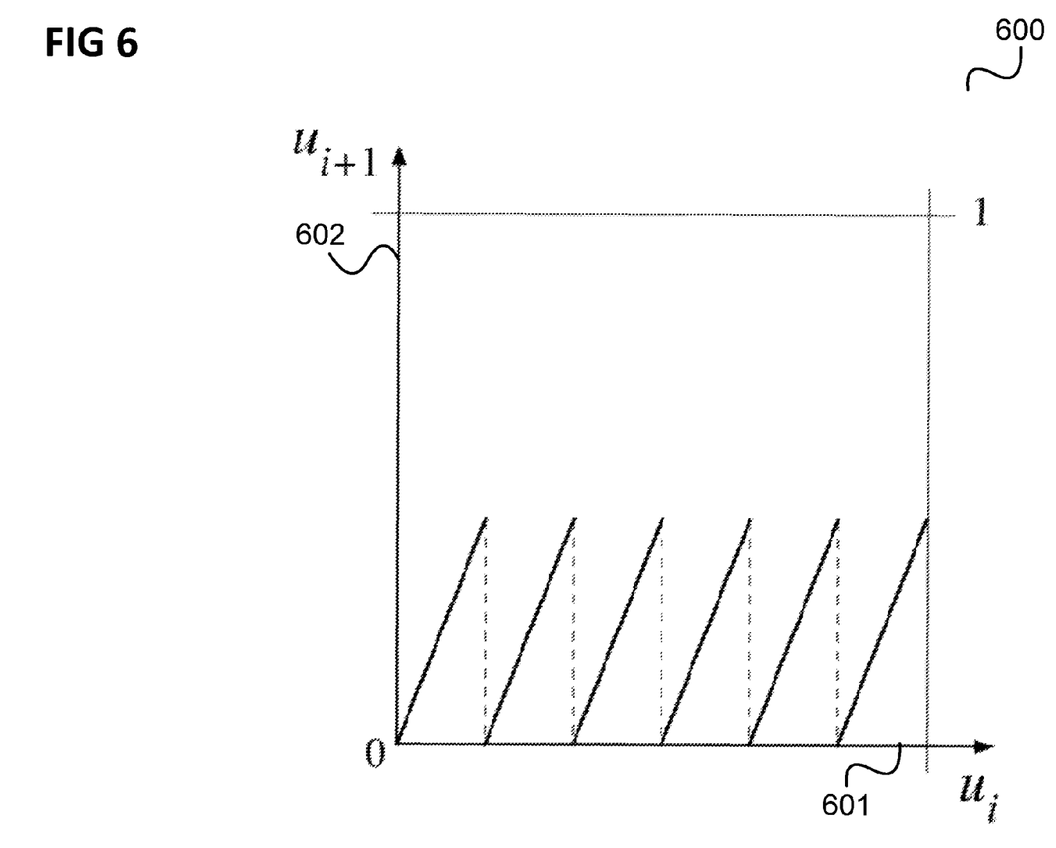

FIG. 4, FIG. 5 and FIG. 6 show chaotic maps 400, 500, 600 for three cases of the chaotic system according to equation (1).

In the chaotic maps, $u_i$ increases from left to right along a respective x-axis 401, 501, 601 and $u_{i+1}$ increases from bottom to top along a respective y axis 402, 502, 602.

FIG. 4 illustrates the case slopeFast<1. In this case, the internal modulus operation of equation (1) can be simplified. In the example shown slopeFast=0.75 and k=2.5.

FIG. 5 illustrates the case slopeFast>1 and slopeSlow<1. In the example shown, slopeFast=2.5 and k=4.

FIG. 6 illustrates the case slopeSlow>1. In this case, the external modulus operation of equation (1) can be simplified. In the example shown slopeFast=6 and k=2.5.

Figure 7:
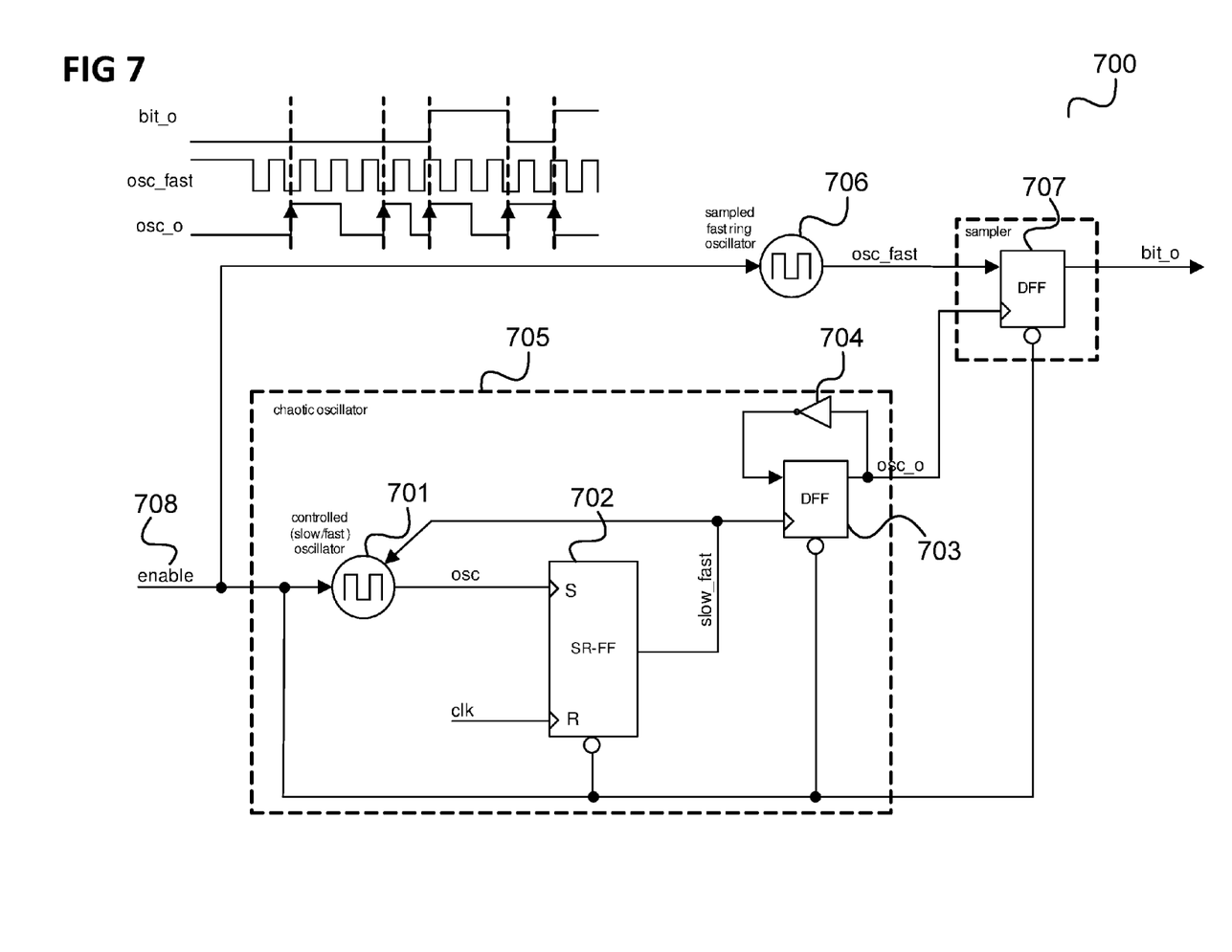
FIG. 7 shows a random number generator.

A way to generate a random stream using the chaotic oscillator 200 is illustrated in FIG. 7.

FIG. 7 shows a random number generator 700.

The random number generator 700 is based on a sampling of a fast oscillator 706. The random number generator 700 includes a chaotic oscillator 705 having a controlled oscillator 701 and a SR-flip-flop 702 as described with reference to FIG. 2. The chaotic oscillator 705 in addition includes a first D-flip-flop 703 receiving the output of the SR-flip-flop 702 as clock signal and its output, inverted by an inverter which includes a feedback of its output to its D input via an inverter 704.

Thus, the control signal slow_fast output by the SR-flip-flip 702 is divided by 2 since the control signal slow_fast may have very short spikes and therefore the divider implemented by the first D-flip-flop 703 ensures a spike-free clock.

The output signal of the first D-flip-flop 703 osc_o is used to sample of the fast oscillator 706 by means of a second D flip-flop 707. Specifically, the output signal of the D first-flip-flop 703 is fed to the clock input of the second D-flip-flop 707 and the output of the fast oscillator 706 is fed to the D input of the second D-flip-flop 707. The components 701, 702, 703, 706, 707 may be activated by an enable signal 708.

The output of the second D-flip-flop 707 is a random output stream bit_o of the random number generator 700.

The entropy of the generated bit stream bit_o cannot be directly derived by the Lyapunov exponent. In best case, the entropy rate of the generated bit stream can be at most 1, while entropy rate of the chaotic oscillator $\log_2(k)>1$, if k>2.

In the following, a random number generator is described which may for example allow extracting the complete entropy generated by a chaotic oscillator as for example shown in FIG. 2 used as noise source in the random number generator.

Figure 8:
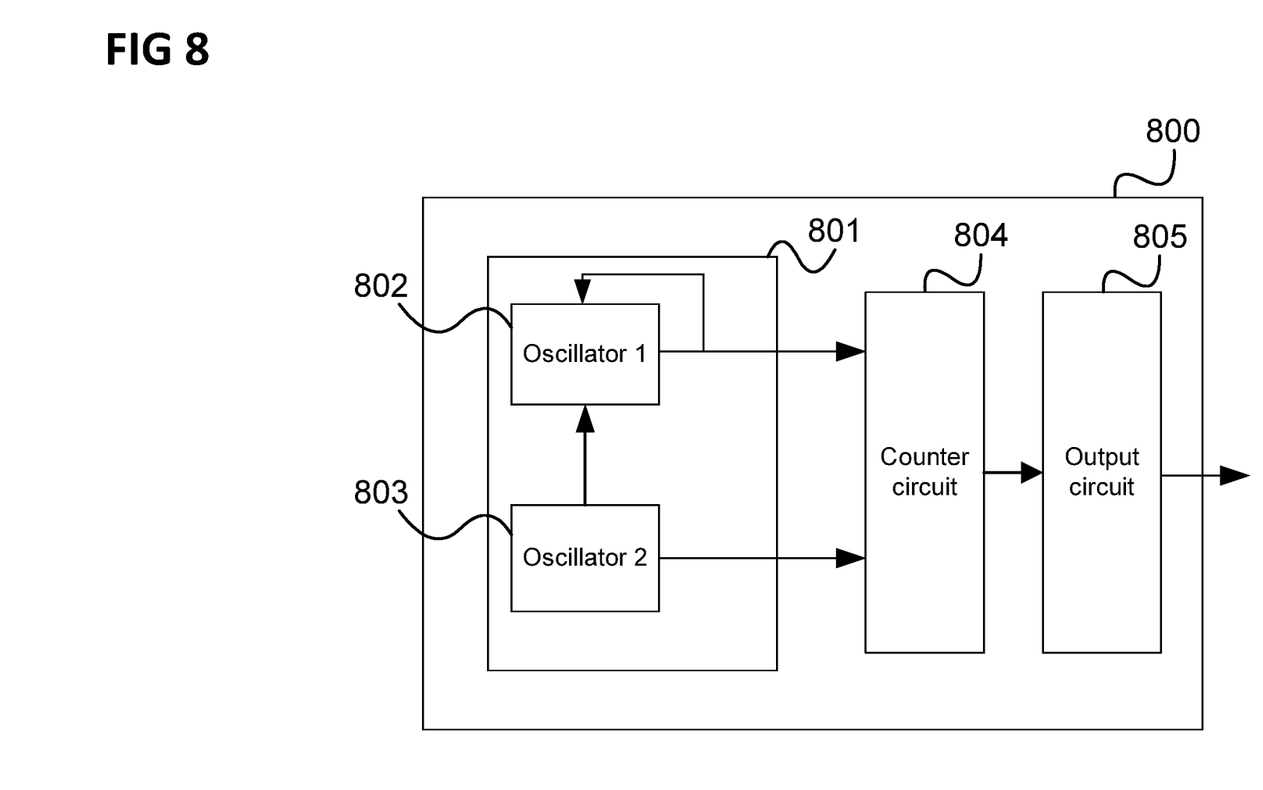
FIG. 8 shows a random number generator according to an embodiment.

FIG. 8 shows a random number generator 800 according to an embodiment.

The random number generator 800 includes an oscillator arrangement 801 including a first oscillator 802 and a second oscillator 803. The oscillator arrangement 801 is configured such that a predetermined output state of the second oscillator 803 triggers a transition of the first oscillator 802 from a first oscillation speed to a second oscillation speed and a predetermined output state of the first oscillator 802 triggers a transition of the first oscillator 802 from the second oscillation speed to the first oscillation speed.

The random number generator 800 further includes a counter circuit 804 configured to count the number of clock cycles of at least one of the first oscillator 802 or the second oscillator 803 between two transitions of the first oscillator 802 from the first oscillation speed to the second oscillation speed and an output circuit 805 configured to output a random number based on the counted number of clock cycles.

In other words, according to one embodiment, a random number stream is determined based on a clock count of a controlled oscillator and/or a reference oscillator, e.g. of a chaotic oscillator as shown in FIG. 2. This allows extracting the maximum entropy of the number sequence (e.g. bit sequence) output by the chaotic oscillator, i.e. allows providing an optimal entropy extractor for a chaotic oscillator.

The first oscillation speed is for example higher than the second oscillation speed.

According to one embodiment, the random number generator includes a flip-flop configured to store a control value for controlling the oscillation speed of the first oscillator wherein the control value is set to a first value by the predetermined output state of the first oscillator and is reset to a second value by the predetermined output state of the second oscillator.

According to one embodiment, the predetermined output state of the first oscillator is a rising clock edge of the first oscillator and the predetermined output state of the second oscillator is a rising clock edge of the second oscillator.

According to one embodiment, the counter circuit includes a first counter configured to count the number of clock cycles of the first oscillator between two transitions of the first oscillator from the first oscillation speed to the second oscillation speed and a second counter configured to count the number of clock cycles of the second oscillator between two transitions of the first oscillator from the first oscillation speed to the second oscillation speed and the output circuit is configured to determine the random number output based on counted number of clock cycles of the first oscillator and based on the counted number of clock cycles of the second oscillator.

The output circuit is for example configured to determine the random number output based on a bijective mapping of pairs of the counted number of clock cycles of the first oscillator and the counted number of clock cycles of the second oscillator to random values.

For example, the output circuit is configured to determine the random number output based on a concatenation of the counted number of clock cycles of the first oscillator and the counted number of clock cycles of the second oscillator.

According to one embodiment, the random number generator includes a detection circuit configured to determine transitions of the first oscillator from the first oscillation speed to the second oscillation speed.

For example, the detection circuit is configured, when it detects a transition of the first oscillator from the first oscillation speed to the second oscillation speed, to output a signal indicating that a transition of the first oscillator from the first oscillation speed to the second oscillation speed has occurred.

The counter circuit is for example configured to count the number of clock cycles based on the signal output by the detection circuit.

The random number generator 800 may be implemented in a processing device, for example as the random number generator 106 of the chip 100.

Accordingly, according to one embodiment, a processing device including the random number generator 800 is provided which is configured to perform a secure operation based on the output random number.

The secure operation is for a cryptographic operation.

The processing device is for example a chip card.

In the following, embodiments are described in more detail.

Figure 9:
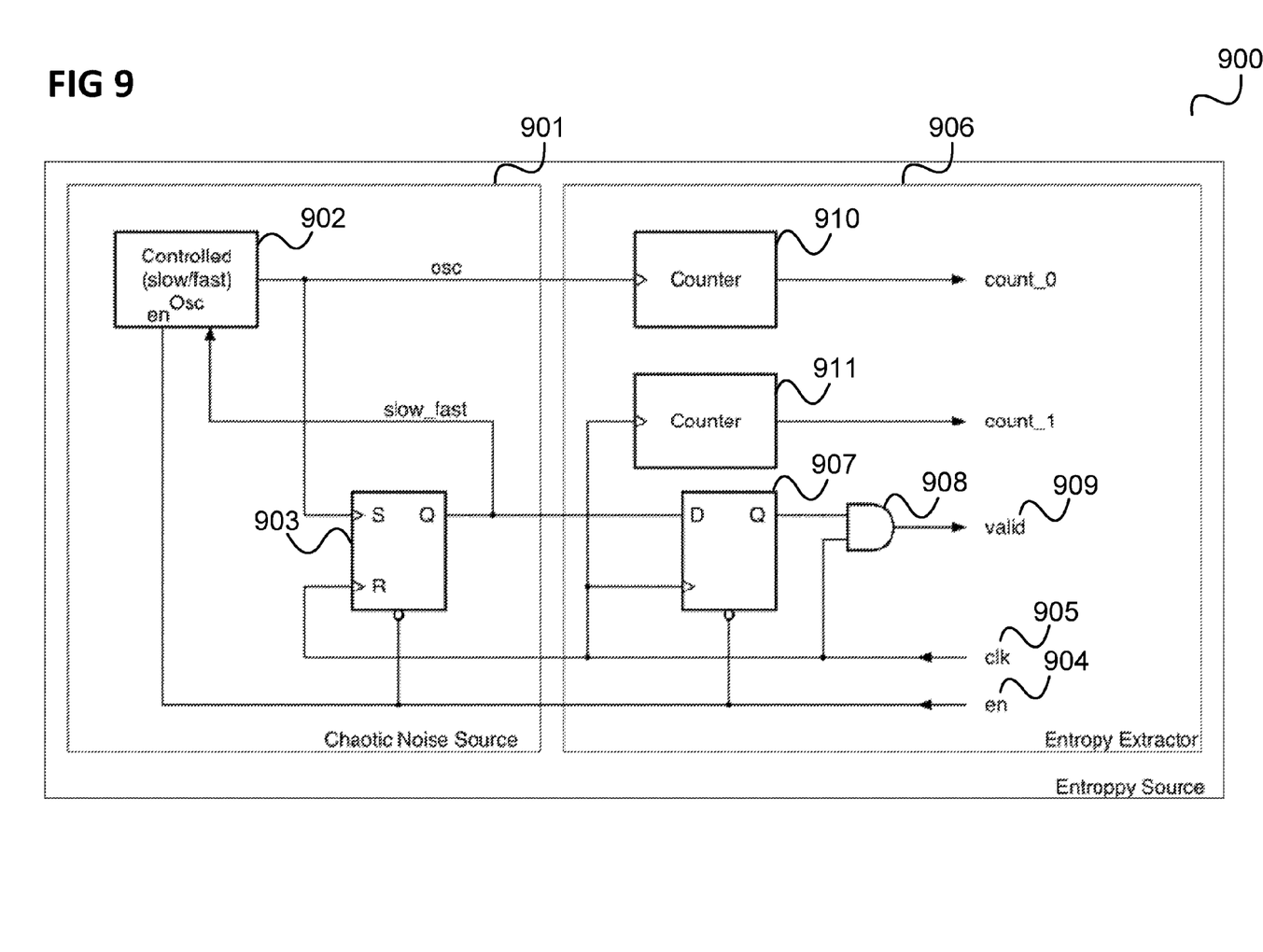
FIG. 9 shows a random number generator according to an embodiment in more detail.

FIG. 9 shows a random number generator 900 according to an embodiment.

The random number generator 900 includes a chaotic noise source in the form of a chaotic oscillator 901 as described above with reference to FIG. 2. Specifically, the chaotic oscillator 901 includes a controlled oscillator 902 and an edge-triggered SR-flip-flop 903 and operates in response to an enable signal 904 and a reference clock signal 905 from a reference oscillator as described above with reference to FIG. 2.

The random number generator 900 further includes an entropy extractor 906 which receives the control signal slow_fast output by the SR flip-flop 903 and the output signal osc of the controlled oscillator 902.

The entropy extractor 906 includes a D-flip-flop 907 which receives the control signal slow_fast at its D input, the reference clock signal 905 at its clock input and which is enabled by the enable signal 904. Its output is fed to an AND gate 908 which receives the clock signal 905 as second input and outputs a valid signal 909. Thus, the valid signal 909 is high when the reference clock 905 enters a new cycle and the controlled oscillator 902 was high during the preceding cycle, i.e. when there is a transition from fast configuration to slow configuration of the controlled oscillator 902. It should be noted that in contrast to the explanations given with respect to FIG. 3 and equation (1), in this example, for implementation reasons (namely the synchronization with the reference clock) an iteration is counted (in accordance with the valid signal) from one transition from fast to slow to the next transition from fast to slow instead of controlled oscillator cycles. This, however, does not affect the final results. Accordingly, with this definition of an iteration, the valid signal 909 indicates the beginning of each iteration.

The entropy extractor 906 further includes a first counter 910 which receives the output signal of the controlled oscillator 902, counts the clock cycles of the output signal osc of the controlled oscillator 902 within each iteration (as given by the valid signal 909) and outputs the number of clock cycles as first counter value count_0.

Further, the entropy extractor 906 includes a second counter 911 which receives the reference clock signal 905, counts the clock cycles of the reference clock signal 905 within each iteration (as given by the valid signal 909) and outputs the number of clock cycles as second counter signal count_1.

The random number generator 900 outputs a random number based on the first counter value and the second counter value count_1. For example, the random number that it outputs is the juxtaposition, i.e. the concatenation, e.g. in terms of binary numbers, of the counter values, i.e. the number $a_1 a_2 \ldots a_n b_1 b_2 \ldots b_m$ when $a_1 a_2 \ldots a_n$ and $b_1 b_2 \ldots b_m$ are the binary representations of the first counter value and the second counter value, respectively, or vice versa. In general, the random number generator 900 may map the pair (count_0, count_1) to random numbers according to a bijective mapping to avoid loss of entropy.

Figure 10:
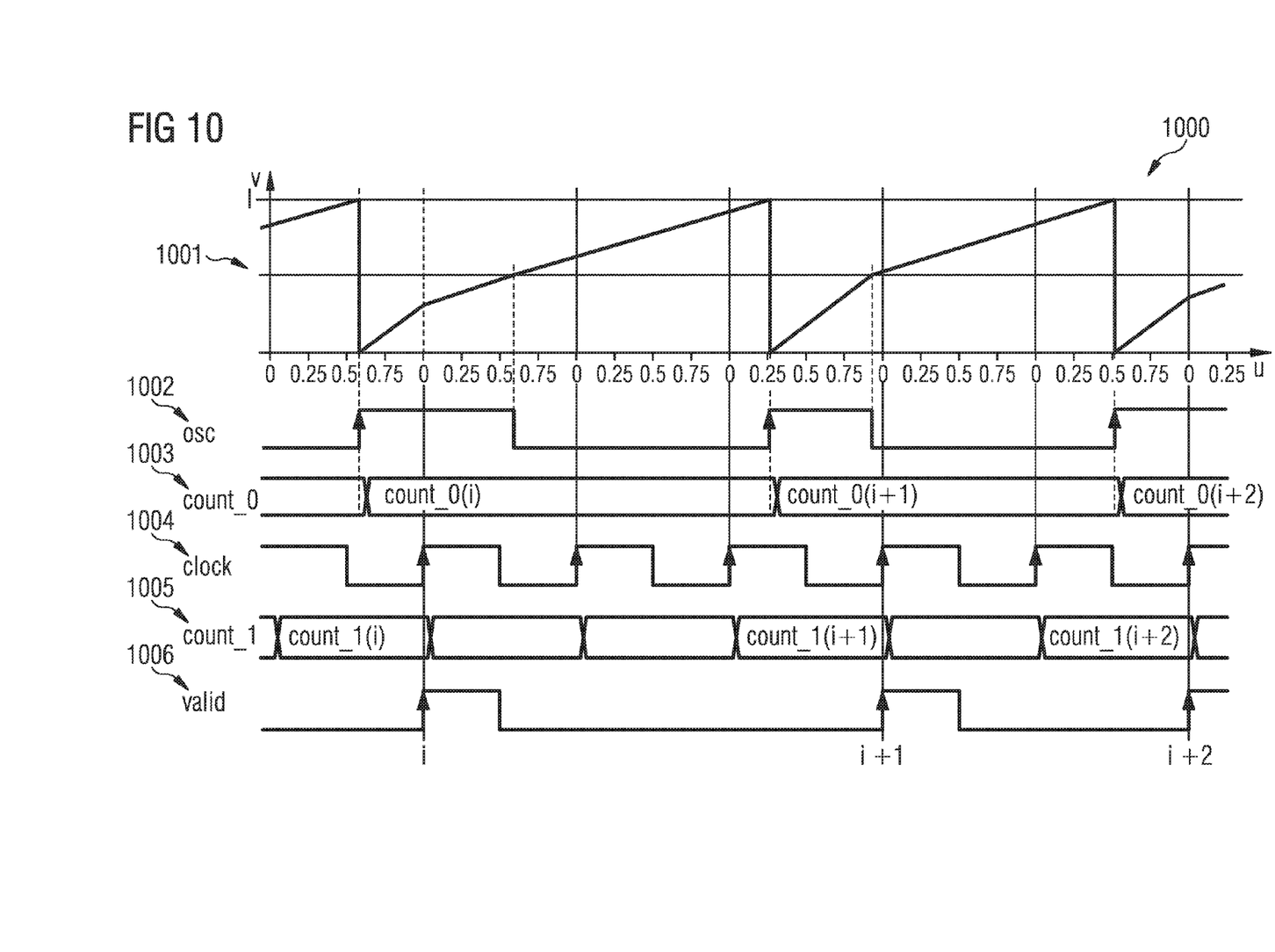
FIGS. 10, 11 and 12 show signal diagrams illustrating the behavior of the number generator of FIG. 9 for the three cases illustrated in FIGS. 4, 5 and 6.
Figure 11:
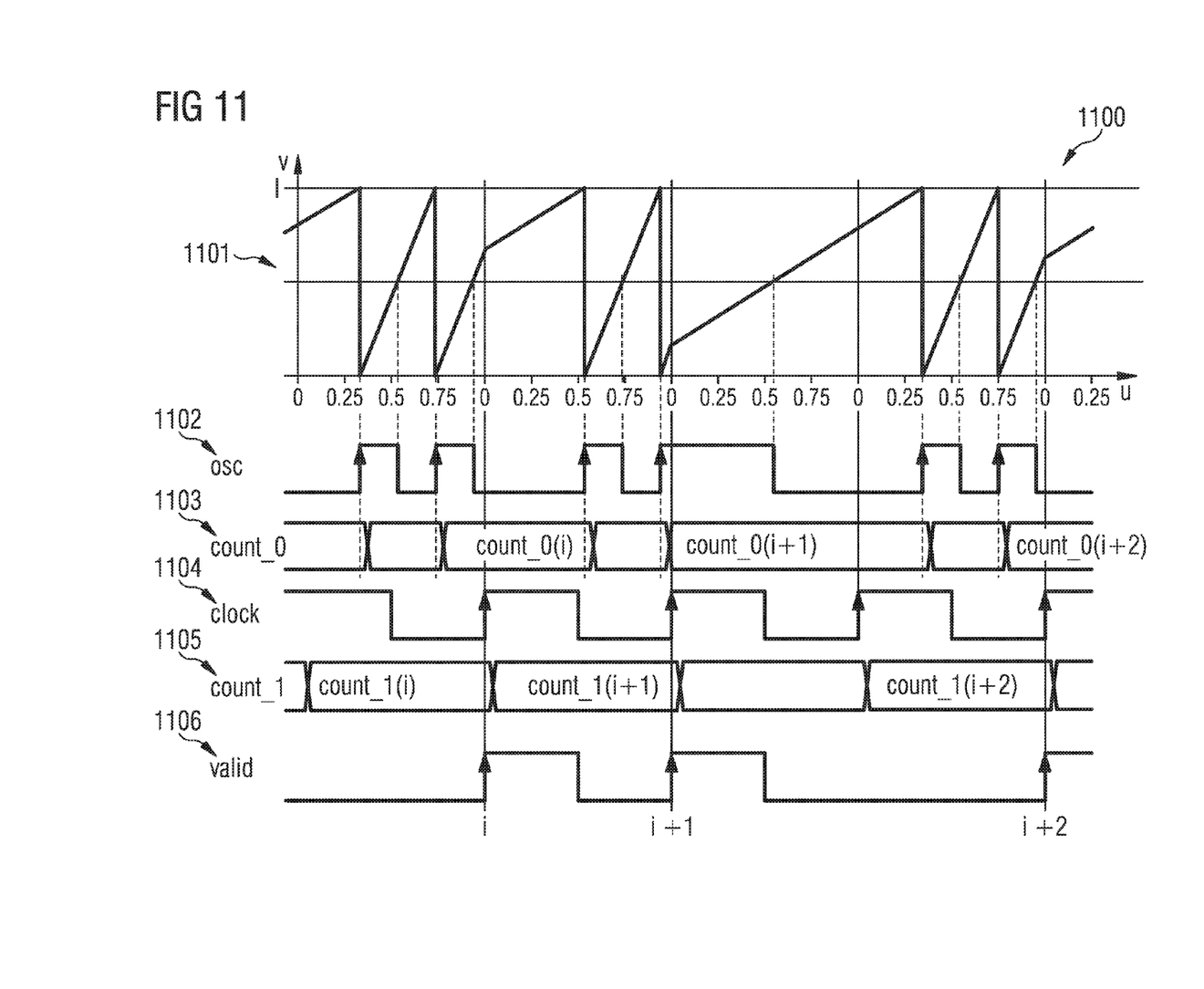
Figure 12:
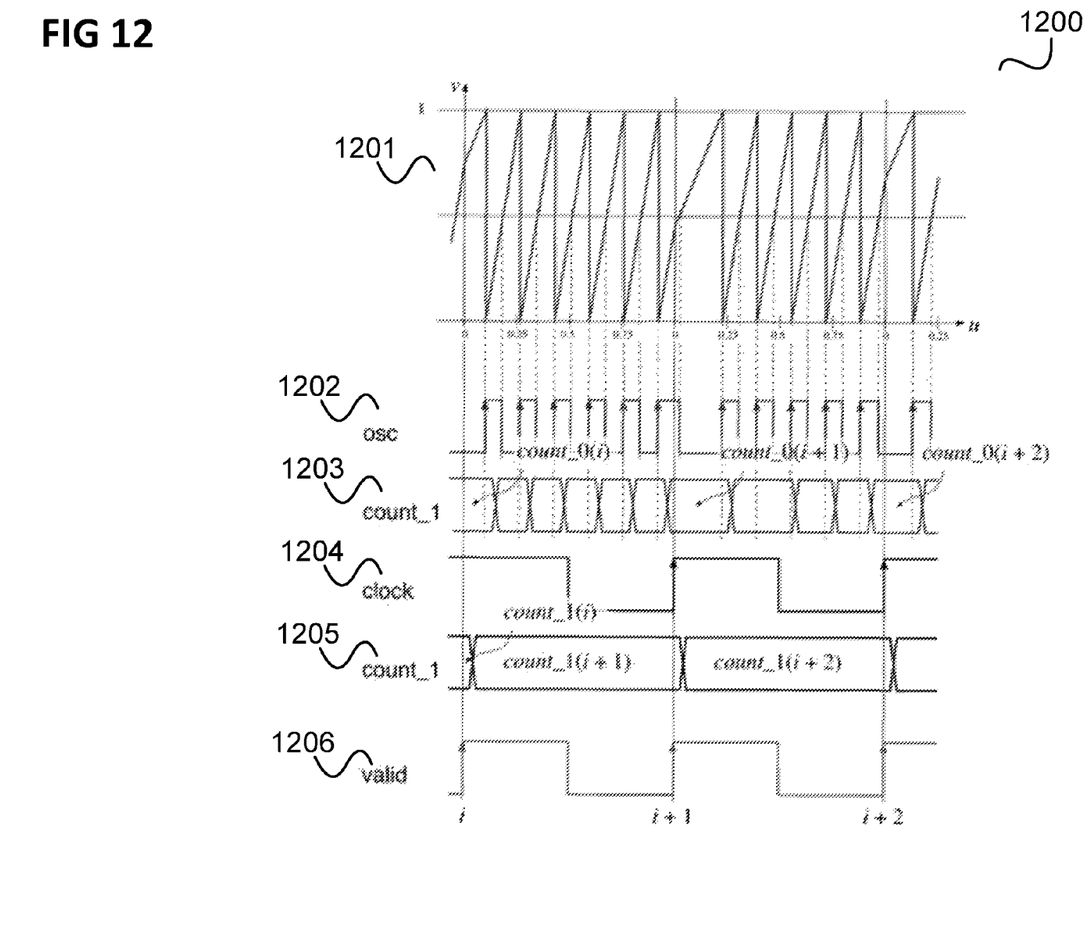

FIG. 10, FIG. 11 and FIG. 12 show signal diagrams illustrating the behavior of the number generator for the three cases illustrated in FIG. 4, FIG. 5 and FIG. 6.

Specifically, FIG. 10, FIG. 11 and FIG. 12 illustrate the phase evolution of the controlled oscillator 902 in a respective first diagram 1001, 1101, 1201, the output signal osc of the controlled oscillator 902 in a respective second diagram 1002, 1102, 1202, the first counter value in a respective third diagram 1003, 1103, 1203, the reference clock signal in a respective fourth diagram 1004, 1104, 1204, the second counter value in a respective fifth diagram 1005, 1105, 1205 and the valid signal in a respective sixth diagram 1006, 1106, 1206. For each FIG. 11, FIG. 12, FIG. 13, the time scale for all diagrams within the figure is the same.

FIG. 10 illustrates the case slopeFast<1, e.g. slopeFast=0.75, k=2.5. As can be seen, one iteration includes always only one cycle of the controlled oscillator while the number of cycles of the reference oscillator (reference clock) varies.

FIG. 11 illustrates the case slopeFast>1 and slopeSlow<1, (e.g. slopeFast=2.5, k=4). As can be seen, one iteration includes a variable number of cycles of both the controlled and the reference oscillator (reference clock).

FIG. 12 illustrates the case slopeSlow>1, e.g. slopeFast=6, k=2.5. As can be seen, one iteration includes always only one cycle of the reference oscillator (reference clock) while the number of cycles of the controlled oscillator varies.

According to one embodiment, in order to extract the complete entropy of the system in every condition, i.e. in all three cases illustrated in FIG. 10 to FIG. 11, the number of cycles performed during one iteration by both oscillators (i.e. controlled oscillator 902 and reference clock) is counted. Alternatively, an embodiment may be configured to operate according to the case slopeFast<1 and only count the number of the reference clock and output a random number based on (only) the second counter value or may be configured to operate according to the case slopeSlow>1 and only count the number of the controlled oscillator 902 and output a random number based on (only) the first counter value.

Since the theoretic entropy rate is $\log_e(k)$ and considering that the entropy could be in only one of the two counters (in the case slopeFast<1 and in the cast slopeSlow>1), in order to contain the entropy which is extracted, according to one embodiment, the two counters values each have a minimum number of bits equal to $\lceil \log_2(k) \rceil$.

Experimentally, it can be observed that entropy rate produced by the entropy extractor 906 is actually $\log_2(k)$, as expected from the theory. In other words, the extractor 906 operates without loss in terms of entropy. The fact that the entropy is extracted without loss is related to the fact that the sequence generated by the extractor 906 corresponds to a partition of the chaotic map in its linear segments: i.e. a different symbol (i.e. pair of first counter value and second counter value) is associated to each linear segment of the chaotic map and a state $u_i$ results in an different output $x_i$ depending to which linear segment it belongs. This also means that the generated output allows to invert the map and to determine $u_{i-1}$ knowing $u_i$ and $x_i$ (the couple $\{u_i, x_i\}$ brings the same information as $u_{i-1}$). These results, with different implementations, can be extended to each piecewise linear chaotic map.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A random number generator, comprising:
    an oscillator arrangement comprising a first oscillator and a second oscillator, wherein the oscillator arrangement is configured such that a predetermined output state of the second oscillator triggers a transition of the first oscillator from a first oscillation speed to a second oscillation speed and a predetermined output state of the first oscillator triggers a transition of the first oscillator from the second oscillation speed to the first oscillation speed;
    a counter circuit configured to count the number of clock cycles of at least one of the first oscillator or the second oscillator between two transitions of the first oscillator from the first oscillation speed to the second oscillation speed; and
    an output circuit configured to output a random number based on the counted number of clock cycles.

2. The random number generator of claim 1,
    wherein the first oscillation speed is higher than the second oscillation speed.

3. The random number generator of claim 1, further comprising:
    a flip-flop configured to store a control value for controlling the oscillation speed of the first oscillator;
    wherein the control value is set to a first value by the predetermined output state of the first oscillator and is reset to a second value by the predetermined output state of the second oscillator.

4. The random number generator of claim 1,
    wherein the predetermined output state of the first oscillator is a rising clock edge of the first oscillator and the predetermined output state of the second oscillator is a rising clock edge of the second oscillator.

5. The random number generator of claim 1,
    wherein the counter circuit comprises a first counter configured to count the number of clock cycles of the first oscillator between two transitions of the first oscillator from the first oscillation speed to the second oscillation speed and a second counter configured to count the number of clock cycles of the second oscillator between two transitions of the first oscillator from the first oscillation speed to the second oscillation speed and the output circuit is configured to determine the random number output based on counted number of clock cycles of the first oscillator and based on the counted number of clock cycles of the second oscillator.

6. The random number generator of claim 1,
    wherein the output circuit is configured to determine the random number output based on a bijective mapping of pairs of the counted number of clock cycles of the first oscillator and the counted number of clock cycles of the second oscillator to random values.

7. The random number generator of claim 1,
    wherein the output circuit is configured to determine the random number output based on a concatenation of the counted number of clock cycles of the first oscillator and the counted number of clock cycles of the second oscillator.

8. The random number generator of claim 1, further comprising:
    a detection circuit configured to determine transitions of the first oscillator from the first oscillation speed to the second oscillation speed.

9. The random number generator of claim 8,
    wherein the detection circuit is configured, when it detects a transition of the first oscillator from the first oscillation speed to the second oscillation speed, to output a signal indicating that a transition of the first oscillator from the first oscillation speed to the second oscillation speed has occurred.

10. The random number generator of claim 9,
    wherein the counter circuit is configured to count the number of clock cycles based on the signal output by the detection circuit.

11. A processing device, comprising:
    a random number generator, comprising:
        an oscillator arrangement comprising a first oscillator and a second oscillator, wherein the oscillator arrangement is configured such that a predetermined output state of the second oscillator triggers a transition of the first oscillator from a first oscillation speed to a second oscillation speed and a predetermined output state of the first oscillator triggers a transition of the first oscillator from the second oscillation speed to the first oscillation speed;
        a counter circuit configured to count the number of clock cycles of at least one of the first oscillator or the second oscillator between two transitions of the first oscillator from the first oscillation speed to the second oscillation speed; and
        an output circuit configured to output a random number based on the counted number of clock cycles;
    wherein the processing device is configured to perform a secure operation based on the output random number.

12. The processing device of claim 11,
    wherein the secure operation is a cryptographic operation.

13. The processing device of claim 11,
    configured as a chip card.

14. A random number generator, comprising:
    a first oscillator and a second oscillator,
    wherein the second oscillator is configured to trigger a transition of the first oscillator from a first oscillation speed to a second oscillation speed when the second oscillator is in a predefined output state;
    wherein the first oscillator is configured to trigger a transition of the first oscillator from the second oscillation speed to the first oscillation speed when the first oscillator is in a predefined output state;
    a counter circuit configured to count the number of clock cycles of at least one of the first oscillator or the second oscillator between two transitions of the first oscillator from the first oscillation speed to the second oscillation speed; and
    an output circuit configured to output a random bit sequence based on the counted number of clock cycles.

15. The random number generator of claim 14, wherein the first oscillation speed is higher than the second oscillation speed.

16. The random number generator of claim 14, further comprising:
a flip-flop configured to store a control value for controlling the oscillation speed of the first oscillator;
wherein the control value is set to a first value by the predetermined output state of the first oscillator and is reset to a second value by the predetermined output state of the second oscillator.

17. The random number generator of claim 14, wherein the predetermined output state of the first oscillator is a rising clock edge of the first oscillator and the predetermined output state of the second oscillator is a rising clock edge of the second oscillator.

18. The random number generator of claim 14, wherein the counter circuit comprises a first counter configured to count the number of clock cycles of the first oscillator between two transitions of the first oscillator from the first oscillation speed to the second oscillation speed and a second counter configured to count the number of clock cycles of the second oscillator between two transitions of the first oscillator from the first oscillation speed to the second oscillation speed and the output circuit is configured to determine the random number output based on counted number of clock cycles of the first oscillator and based on the counted number of clock cycles of the second oscillator.

19. The random number generator of claim 14, wherein the output circuit is configured to determine the random bit sequence output based on a bijective mapping of pairs of the counted number of clock cycles of the first oscillator and the counted number of clock cycles of the second oscillator to random values.

20. The random number generator of claim 14, wherein the output circuit is configured to determine the random bit sequence output based on a concatenation of the counted number of clock cycles of the first oscillator and the counted number of clock cycles of the second oscillator.

* * * * *